Aug. 3, 1943.                A. H. SCHUTTE                2,325,635
                           CONTINUOUS FILTER
              Original Filed Feb. 25, 1939       2 Sheets-Sheet 1
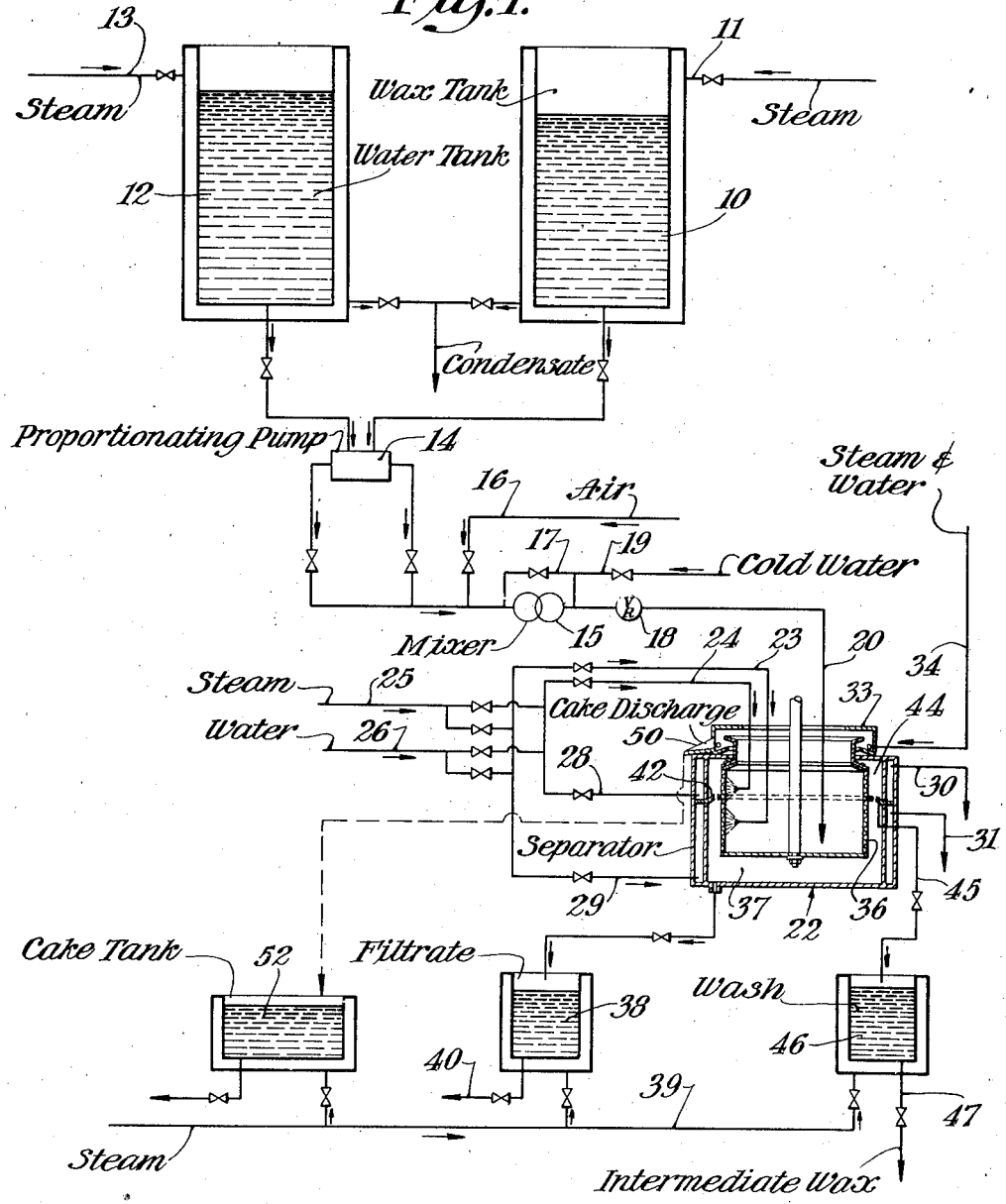
INVENTOR
August Henry Schutte
BY
ATTORNEY

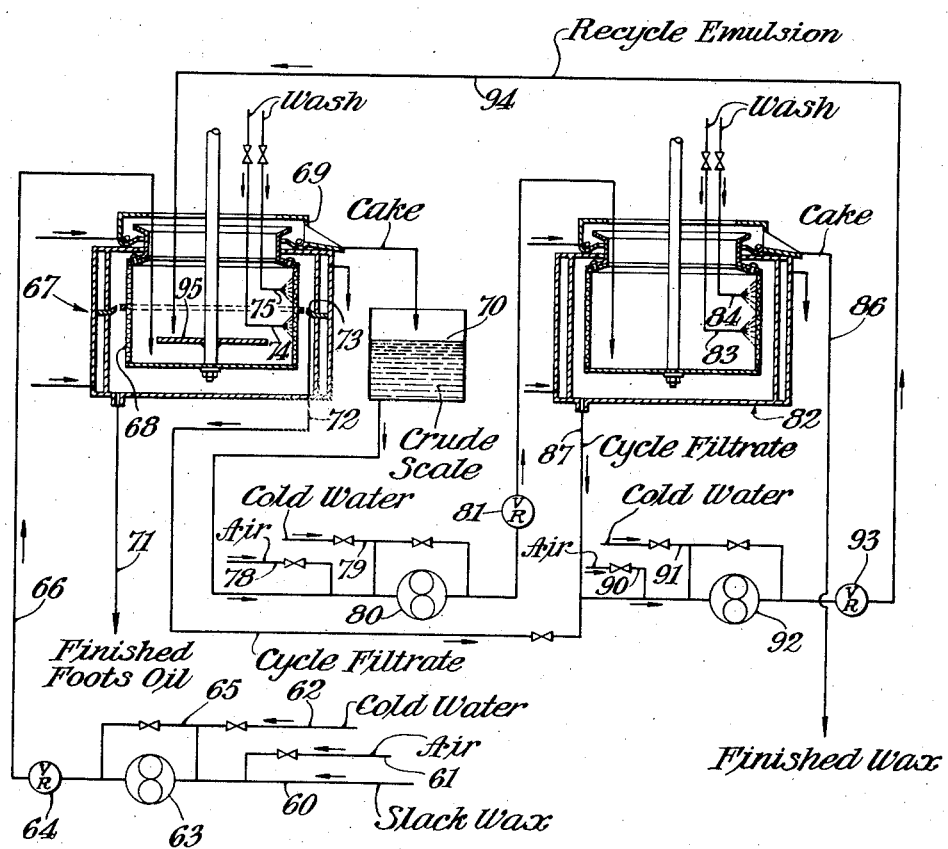

Patented Aug. 3, 1943

2,325,635

UNITED STATES PATENT OFFICE 2,325,635

CONTINUOUS FILTER

August Henry Schutte, Tuckahoe, N. Y.

Original application February 25, 1939, Serial No. 258,527. Divided and this application January 12, 1940, Serial No. 313,494

8 Claims. (Cl. 196—19)

This invention relates to improvements in the method of and apparatus for continuously separating liquids from solids by centrifugal filtration, and in one form of embodiment is an improvement on the invention disclosed in my prior application, Serial Number 232,263, now Patent No. 2,168,306, patented August 1, 1939, and is a division of my application, Serial Number 258,527, filed February 25, 1939.

I have heretofore disclosed a method of separating wax from waxeous mixtures by the emulsification of the waxeous mixture with an immiscible and non-solvent material and thereafter cooling the emulsion to precipitate out certain portions of the wax, after which separation was accomplished in a suitable filter, preferably of the centrifugal type.

My present invention relates to an improvement on such invention and more particularly relates to the use of a continuous centrifugal filter by which the operation can be rendered continuous.

A general object of the invention is to provide a centrifugal filtering device which is adapted to discharge a filter cake autogenously and continuously while filtration and washing are being carried out therein, and without the addition of moving parts to a machine of the conventional batch type.

A particular object of my invention is to provide a continuous centrifugal filtering operation to continuously filter emulsions of waxeous mixtures for the separation of various melting point constituents therefrom.

A still further object of the invention is to provide an improved method of centrifugally filtering and washing a slurry mixture of such density that additional slurry may be continuously introduced to one part of the filter and a cake may be continuously removed from another part of the filter without the necessity of any moving parts other than the rotor and without resort to scraping or propelling devices. In this device the cake removal is self-motivating.

Further objects and advantages of the invention will appear from the following disclosure of a preferred form of embodiment thereof taken in connection with the attached drawings which are illustrative thereof, and in which:

Figure 1 is a typical flow sheet for the wax treatment together with diagrammatic details of the centrifuge apparatus; and Figure 2 is a diagrammatic showing of a modified form of flow arrangement.

As more particularly described in my prior application above referred to, the separation of different melting point waxes from a waxeous mixture may be carried out by forming an emulsion of the waxeous mixture with a non-solvent immiscible material, more particularly water. As shown in the drawing, the waxeous mixture is carried in a suitable jacketed tank 10 which is provided with a steam connection 11 for the purpose of maintaining the wax mixture at the desired temperature. The water or other non-solvent and immiscible liquid may be conveniently carried in a similar tank 12, which is jacketed to receive steam from the line 13. The wax and the water are formed into an emulsion in the correct proportions by being passed through the proportionating pump 14, and then being passed through a suitable type mixer 15, either with or without the addition of air or other inert gaseous material at 16. The mixer 15 is provided with a bypass 17 and normally pumps against a relief valve 18 so that an emulsion is made.

This emulsion is in the form of a foamy material which resembles in appearance whipped cream or shaving lather and is sufficiently stable to permit the subsequent treatment. Temperature control is preferably obtained by indirect heat exchange or by the direct introduction of cold water as at 19, which is sufficient to solidify the higher melting point waxes in the emulsion. The emulsion is discharged at 20 into the separator generally indicated at 22.

The separator 22 is preferably a centrifugal basket type filter having a perforated rotating basket 35 lined on the interior with a foraminous filter medium. This is rotated at such a speed that a high separating or filtering force is obtained. With the particular wax treated as hereinafter described, it is convenient to make this filter medium of woven wire or filter duck, and it is possible to obtain a filter force in the range of 500 to 1000 times gravity. As the filtering force is gravitational by nature, the entire cake is subjected to the force without an external crushing action, and the cake formed is a fine grained, free-filtering, porous mass, which is permeable to wash liquid. The cake is evenly dried and washing can be readily accomplished on this type of filter.

The wash liquid may be applied in either or both of two places as indicated, the wash lines 23 and 24 being suitably connected to steam and water lines 25 and 26 respectively, in such manner that accurate temperature control can be had.

The separator 22 is also preferably jacketed, with a heating medium introduced at 28 and 29, and with the medium taken off at 30 and 31. Steam and water may also be introduced around the cake removing channel 33 as by the line 34.

In the operation of the separator 22, a filtrate will be removed through the foraminous basket 36 and some of the filtrate collected in the lower chamber 37 of the separator. This filtrate may be collected in the filtrate tank 38, which is conveniently jacketed and heated as by line 39 so that the filtrate can be removed through the line 40.

If desired, a partition 42 may be used part way up the side wall of the filter basket 36, which tends to divide the filter into two sections, forming an upper filtrate compartment 44. The filtrate in this section may be removed through the line 45 and collected in the wash tank 46, which is similarly jacketed and heated from the line 39 so that the product may be removed at 47. In this case, however, the collected material may be an intermediate wax as will hereinafter be described.

Ordinarily a centrifugal filter of the type described has but a very limited capacity due to the volumetric limitations of the diameter, height and effective thickness of the cake. After a few minutes required to fill the machine, and a few minutes' operation for washing the cake, it is then necessary to remove the material as by an internal scraper. Thereafter operations are again resumed so that the effect is of a batch nature.

I have now found, however, that if I continue to introduce the emulsion of wax and immiscible non-solvent liquid, the cake builds up to a certain extent and because of the controlled nature of the cake, it will discharge over the top and can be collected in the trough 33, melted and removed from the machine at 50, such cake being carried into a cake tank 52. It is, of course, to be understood that if melting of the cake were undesirable, mechanical, hydraulic, or other means could be used for this cake removal.

This continuous discharge of cake out of the filter represents a new phenomenon not heretofore known to me, and appears to be due to the fact that the slurry introduced through the line 20 near the bottom of the separator 36, is heavier than the material that is discharged over the top. It is to be understood that the emulsion contains not only solidified wax, but also a liquid wax and water. The liquid wax penetrates the foraminous filter basket and is removed. Similarly, a substantial part of the water of the emulsion, as well as the wash water introduced at 23 and 24, is also discharged through the foraminous basket. The filter cake resulting, therefore, is of less specific gravity than the emulsion because it is porous as a result of the emulsification. It is also semi-plastic so that it will tend to move upward due to the differential of forces acting in this direction. The lip on the basket 36 which controls the thickness of the cake does not prevent its discharge which is controlled solely by the rate of slurry feed as it is a direct volumetric displacement.

In experiments which I have conducted with a 109° F. melting point slack wax charge containing 30 to 35% oil, I have formed a 1½" cake on a centrifugal filter of 10" in diameter, which was operated at 1900 to 2300 R. P. M. From such machine, I have continuously collected in the trough 33 a wax of 122½° F. melting point containing 2 to 3% oil. Furthermore, I have found by introducing feed containing an insoluble dye that the feed material penetrates the previously deposited wax cake at the bottom and pushes it up by volumetric displacement. A cross section of the cake so formed shows that the new material takes a parabolic form with the axis vertical, and on the outer wall adjacent the foraminous lining. This shows the resultant of forces which continuously move the filter cake through the filtering zone, past the washing zone and eventually out into the trough 33.

I find that I can definitely control the upward movement of the filter cake and can so control the time factor that I can continuously filter at the equivalent rate of 1200 barrels per day of a slack wax of the above type in a filter 60" in diameter and 36" high. The rate of travel on such a machine is approximately 3.6" per minute.

It will be apparent that the continuous operation of such a device is a material improvement over the batch or semi-continuous process and, inasmuch as there are no moving parts except the basket itself, and as there is no scraper or other device which might tend to harm the rotating basket, I am able to obtain very successful yields with a very minimum of equipment, labor and upkeep. The conditions can be adjusted entirely externally of the apparatus so that the character of discharged material may be controlled. The intermediate wax drawn off at 47 is a result of this operation and such intermediate wax may be recycled if desired.

It will also be apparent that the invention can be carried out with any filter cake provided that the slurry is of a greater density than the resulting porous filter cake so that the slurry will displace the cake at a desired rate. The resultant of forces due to the differential of specific gravity of the slurry and cake must be sufficient to overcome the resistance to the motion of the cake.

This invention may be applied to the continuous filtration of sewage sludge, soybean and other vegetable oil extraction, fatty acid separation, cereal flour extraction, drying of chemical salts such as Glauber's salts, etc., extraction of starch, and other operations in which the conditions are as specified.

A modified flow diagram for the recycling of intermediate wax is shown in Figure 2. In this arrangement, provision is made for recycling this intermediate wax cake removed from the first operation, and its reintroduction to a second filter at a predetermined point substantially adjacent a zone of similar quality of cake for a further filtration without contamination.

The filtrate from the second machine, instead of being mixed with the primary oily charge, with resulting oil solubility loss effect, is separately emulsified and fed to the primary machine at a point above the oily charge feed. This is analogous to feeding a fractionating tower above the stripping section and below the fractionating decks.

More particularly, the apparatus is adapted to treat slack wax for the purpose of separating desired melting point waxes. In this form of embodiment of the invention, the slack wax feed at 60 is conveniently mixed with air or other inert gas at 61 and water introduced at 62, and is emulsified by mixer 63 which is conveniently a pump which, because of valve 64, recirculates the mixed materials through bypass 65. The resulting emulsion is discharged at 66 to the first centrifugal filter generally indicated at 67.

The filter 67 is of the type heretofore described and is conveniently jacketed for desired temperature control. It is provided with the rotating filter cage 68 into the bottom of which the wax emulsion is introduced. The cake is continuously discharged by the autogenous displacement of the light cake by the relatively heavy slurry and is removed from the trough 69 and collected in crude scale tank 70. The finished foots oil is removed at 71. A cycle filtrate can be removed at 72 from the upper portion of the filter if the partition 73 is used. Washing of the filter cake at 74 and 75 is usually found desirable.

The crude scale wax collected at 70 is preferably treated again by re-emulsifying with inert gas or air at 78 and immiscible and non-solvent liquid or water at 79 by mixer 80 and the emulsion is discharged through valve 81 into the second filter generally referred to at 82. This is similarly jacketed to facilitate the temperature control and is provided with wash nozzles at 83 and 84.

In the second filter, the finished wax is removed as cake at 86 and the cycle filtrate is removed at 87. The temperature control and wash medium permit precise control of the quality of the final wax.

The cycle filtrates from the second filter at 87 and from the first filter at 72 are then combined and emulsified with an inert gas, such as air, at 90 and with a non-solvent and immiscible liquid, such as water, at 91 and passed through the mixing device 92, and the emulsion, which discharges through valve 93, is discharged into the first filter through line 94. In this case, however, this recycle emulsion is introduced at a point somewhat higher than the slack wax emulsion. A disc 95 maintains this feed at the desired level.

As previously pointed out, the recycle emulsion, having been partially freed of foots oil in the first filtration, is not subject to oil solubility loss as it is above the point of initial feed and has substatnially the same characteristics as the filter cake at such zone. Recycling not only adds to the complete separation of finished wax from foots oil, but when accomplished as here pointed out, there is no tendency to contaminate the foots oil and maximum yields, with a minimum of circulation, are possible.

As an example of the products which I have obtained on a two-stage operation, I show the following: Feeding 110° F. melting point slack wax, the finished foots oil from the first machine is 85° to 90° F. melting point. The crude scale wax is about 124° F. to 126° F. melting point, and from this is produced a finished wax having the desired 133° F. to 133.5° F. melting point.

While I have shown a preferred form of embodiment of my invention, I am aware that modifications may be made thereto and I, therefore, desire a broad interpretation of my invention within the scope and spirit of the description herein and of the claims appended hereinafter.

I claim:

1. Apparatus for separating a high melting point wax from "foots" oil in slack wax which comprises means to form an emulsion of the slack wax, centrifugal filter means to separate a crude scale wax as filter cake from the "foots" oil, means to wash the cake to form a waxeous cut as a cycle filtrate, means to separately collect the crude scale wax and "foots" oil, means to collect the cycle filtrate, means to emulsify the crude scale wax, centrifugal filter means to filter said emulsion and to separate a finished high melting point wax from a second cycle filtrate, means to emulsify the cycle filtrate from both filters, and means to introduce said recycled emulsion to a zone in the first filter spaced from the feed of the slack wax emulsion, and at a zone of comparative equality of composition of the filtrable liquid in the recycle emulsion and in the filter cake present on the filter.

2. Apparatus for separating a specified melting point wax from a mixture of various waxes or waxes and oils, which comprises means to form an emulsion thereof with water and an inert gas, means to cool and agitate said emulsion to precipitate the desired melting point material said emulsion being in the form of a foam, centrifugal filter means to separate the liquid constituents from the solid constituents and to form a porous cake of the solid constituents directly supported on the wall of the filter means through substantially its entire area, means to control the cake thickness, means to control the rate of discharge of the cake said means comprising a valve controlling the rate of feed of emulsion to the centrifugal filter means, means to wash said cake during movement along the wall of the filter means to the discharge, said wash tending to separate further liquid constituents therefrom as an intermediate product between the liquid and the solids, said cake continuously discharging as an annular mass due to the resultant of forces thereon caused by the difference in densities of the cake and emulsion feed.

3. The method of continuously removing a specified melting point wax from a mixture of various waxes or waxes and oils, which comprises the steps of emulsifying the wax solution with an immiscible and non-solvent liquid material and an inert gas, solidifying the desired waxes in the emulsion by cooling the emulsion to a temperature below the melting point thereof, and continuously centrifuging a continuous stream of the cooled emulsion to form a porous wax cake of substantially the desired melting point characteristics, the continuity of the feed stream causing a continuous discharge of the cake as an annular mass due to the resultant of forces thereon caused by the difference in densities of the cake and the emulsion feed.

4. The method of continuously separating a specified melting point wax from a mixture of various waxes or waxes and oils, which comprises the steps of emulsifying the wax solution with an immiscible and non-solvent liquid material and an inert gas, cooling the emulsion to precipitate the specified melting point wax, continuously filtering a continuous stream of the cooled emulsion under centrifugal force in a centrifugal filter to form a porous wax cake of substantially the desired melting point characteristics on the filter wall and continuing the feed of emulsion to cause a continuous discharge of the cake as an annular mass due to the resultant of forces thereon caused by the difference in densities of the cake and the emulsion feed.

5. The method of continuously removing a specified melting point wax as claimed in claim 4, which includes washing the cake during its movement to the discharge point and separately collecting a material intermediate in melting point between the liquid filtrate and the cake.

6. The method of continuously removing a specified melting point wax as claimed in claim 4, which includes washing the cake during its movement to the discharge point, separately collecting a material intermediate in melting point between the liquid filtrate and the cake, re-emulsifying said intermediate melting point material, cooling said re-emulsified material and introducing said cooled re-emulsified material to the centrifugal filter at a zone of comparative equality of composition of the filtrable liquid in the re-cycled emulsion and in the filter cake present on the filter.

7. The method of continuously filtering a high melting point wax from lower melting point waxes which comprises emulsifying the waxeous mixture with an immiscible and non-solvent liquid and an inert gas, cooling said emulsion to solidify a part of the wax, feeding said emulsion as a slurry to a basket centrifugal filter adjacent the closed end thereof, said filter being within a filtrate collection housing, rotating said filter to form a porous wax cake on the wall thereof by the centrifugal removal of the liquid constituents of the emulsion through the solid particles of the cake and through the filter medium, said cake being lighter than the slurry and being directly supported by the filter wall, removing the filtrate without permitting its accumulation in the housing and continuously feeding additional emulsion to discharge the wax cake as an annular mass substantially parallel to the axis of rotation, said discharge being due to the resultant of forces on the cake caused by the difference in densities of the deposited cake and the initial slurry.

8. Apparatus for separating a high melting point wax from foots oil and slack wax, which comprises means to form an emulsion of the slack wax, centrifugal filter means to separate a crude scale wax as filter cake from the foots oil, means to wash the cake to form a waxeous cut as a cycle filtrate, means to separately collect the crude scale wax and foots oil, means to collect the cycle filtrate, and conduit means to recycle the cycle filtrate back to said filter means whereby a continuous yield of a low melting point foots oil and a crude scale wax is produced.

AUGUST HENRY SCHUTTE.